United States Patent
Criddle et al.

(10) Patent No.: US 8,032,618 B2
(45) Date of Patent: Oct. 4, 2011

(54) ASYNCHRONOUS UPDATE OF VIRTUALIZED APPLICATIONS

(75) Inventors: Jefferson Criddle, Bellevue, WA (US); Gurashish Singh Brar, Redmond, WA (US); Joe Keng Yap, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 12/478,791

(22) Filed: Jun. 5, 2009

(65) Prior Publication Data

US 2010/0312865 A1 Dec. 9, 2010

(51) Int. Cl.
*G06F 15/177* (2006.01)

(52) U.S. Cl. .................................... 709/221; 709/220

(58) Field of Classification Search .......... 709/220–221; 717/173
See application file for complete search history.

(56) References Cited

U.S. PATENT DOCUMENTS

| | | | |
|---|---|---|---|
| 2005/0210459 A1* | 9/2005 | Henderson et al. | 717/168 |
| 2006/0184652 A1 | 8/2006 | Teodosiu et al. | |
| 2006/0184935 A1 | 8/2006 | Abels et al. | |
| 2007/0094348 A1 | 4/2007 | Scheidel et al. | |
| 2007/0271561 A1 | 11/2007 | Winner et al. | |
| 2008/0086728 A1 | 4/2008 | Lam et al. | |
| 2008/0196022 A1* | 8/2008 | Diederichs | 717/173 |
| 2008/0244577 A1 | 10/2008 | Le et al. | |
| 2009/0007105 A1 | 1/2009 | Fries et al. | |

OTHER PUBLICATIONS

Kinney, Anthony, "Getting Started with Microsoft Application Virtualization", "TechNet Magazine", retrieved at <<http://technet.microsoft.com/en-us/magazine/2008.10.appv.aspx>>, Oct. 2008, pp. 4.

"VMware Update Manager", retrieved at <<http://www.eaglesoft.com/resources/vmware/virtualinfrastructure/update_manager_datasheet.pdf>>, pp. 2.

"Virtual Application Management with Microsoft Application Virtualization 4.5 and System Center Configuration Manager 2007 R2", retrieved at <<http://download.microsoft.com/download/f/7/8/f784a197-73be-48ff-83da-4102c05a6d44/App-V_and_ConfigMgr_Whitepaper_Final.docx>>, pp. 48.

"VMware, Citrix Expand Virtual Desktop Technology", retrieved at <<http://www.crn.com/software/208403382>>, Mar. 18, 2009, pp. 8.

"VMware Update Manager", retrieved Mar. 18, 2009 from http://www.eaglesoft.com/resources/vmvvare/virtualinfrastructure/update_manager_datasheet.pdf, 2 pages.

(Continued)

*Primary Examiner* — Ario Etienne
*Assistant Examiner* — Hee Kim
(74) *Attorney, Agent, or Firm* — Hope Baldauff Hartman, LLC (57) ABSTRACT

A determination is made as to whether an updated image for an outdated virtualized application is available on a server. If it is determined that the updated image is available, then a background download operation configured to retrieve the updated image from the server is initiated. Another determination is made as to whether the outdated virtualized application is being utilized. After the background download operation is complete, if it is determined that the outdated virtualized application is not being utilized, then the outdated virtualized application is transformed to a current virtualized application by replacing at least a portion of the outdated virtualized application with the updated image. The outdated virtualized application and the current virtualized application are configured to be executed on the computer without installation on a computer.

8 Claims, 6 Drawing Sheets

OTHER PUBLICATIONS

"Virtual Application Management with Microsoft Application Virtualization 4.5 and System Center Configuration Manager 2007 R2", Oct. 2008, retrieved Mar. 18, 2009 from http://download.microsoft.com/download/f/7/8/f784a197-73be-48ff-83da-4102c05a6d44/App-V_and_ConfiqMqr_WhitepaperJinal.docx, 48 pages.

* cited by examiner

ASYNCHRONOUS UPDATE OF VIRTUALIZED APPLICATIONS

BACKGROUND

In conventional implementations, applications are typically installed on each computing device on which the application is executed. When an application is installed on a computing device, intrusive changes may be made to the operating system. In this regard, different versions of the same application are often developed for installation on different operating systems. Further, the application, when installed on a particular computing device, may be tied to that computing device. In order to address these and other drawbacks of installed applications, application virtualization has been developed.

In application virtualization, a host operating system creates a simulated computer environment or virtual environment on a computing device to execute virtualized applications without installing the virtualized applications locally and without altering the host operating system. The virtualized applications execute locally using the local hardware resources and may interact with the host operating system, although aspects of the virtual environment may be hidden from the host operating system (e.g., registry keys, files, etc.). Because virtualized applications do not alter the host operating system, the same virtualized application may also operate on different operating systems.

It is with respect to these and other considerations that the disclosure made herein is presented.

SUMMARY

Technologies are described herein for asynchronously updating virtualized applications. Through the utilization of the technologies and concepts presented herein, an application virtualization engine may asynchronously update a virtualized application through a background download operation and an update operation. The background download operation may retrieve an updated image from a server without affecting the user's operation of the virtualized application. The update operation may update the virtualized application at a time when a user is not utilized the virtualized application also without affecting the user's operation of the virtualized application. The background download operation and the update operation may be robust against network connection errors.

According to one embodiment, a method is provided herein for updating a virtualized application on a computer coupled to a server on a network. According to the method, a determination is made as to whether an updated image for an outdated virtualized application is available on a server. If it is determined that the updated image is available, then a background download operation configured to retrieve the updated image from the server is initiated. Another determination is made as to whether the outdated virtualized application is being utilized. After the background download operation is complete, if it is determined that the outdated virtualized application is not being utilized, then the outdated virtualized application is transformed to a current virtualized application by replacing at least a portion of the outdated virtualized application with the updated image. The outdated virtualized application and the current virtualized application are configured to be executed on the computer without installation on a computer.

It should also be appreciated that the above-described subject matter may also be implemented as a computer-controlled apparatus, a computer process, a computing system, or as an article of manufacture such as a computer-storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for updating a virtualized application. When an updated image for an outdated virtualized application is available on a server, an application virtualization engine may initiate a background download operation in which the updated image is retrieved from the server. The background download operation may be performed without affecting the operation of the outdated virtualized application. The background download operation may be performed in an automated matter with or without user intervention.

The background download operation may be complete when the updated image has been completely downloaded. When the background download operation has completed, the outdated virtualized application may be updated after a current session of the outdated virtualized application has ended. After the current session of the outdated virtualized application has ended, the application virtualization engine may initiate an update operation in which the outdated virtualized application is transformed to a current virtualized application by replacing at least a portion of the outdated virtualized application with the updated image. The update operation may be performed in an automated matter with or without user intervention. After the update operation is complete, the application virtualization engine can execute the current virtualized application.

Because the background download operation is performed without affecting the operation of the outdated virtualized application, a loss of connection to the server does not cause the outdated virtualized application to enter into an unusable state. Thus, the background download operation may be robust against network connection errors. Further, because the update operation is performed using the locally-stored updated image that has been completely downloaded, the update operation may be efficiently performed and may also be robust against network connection errors.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
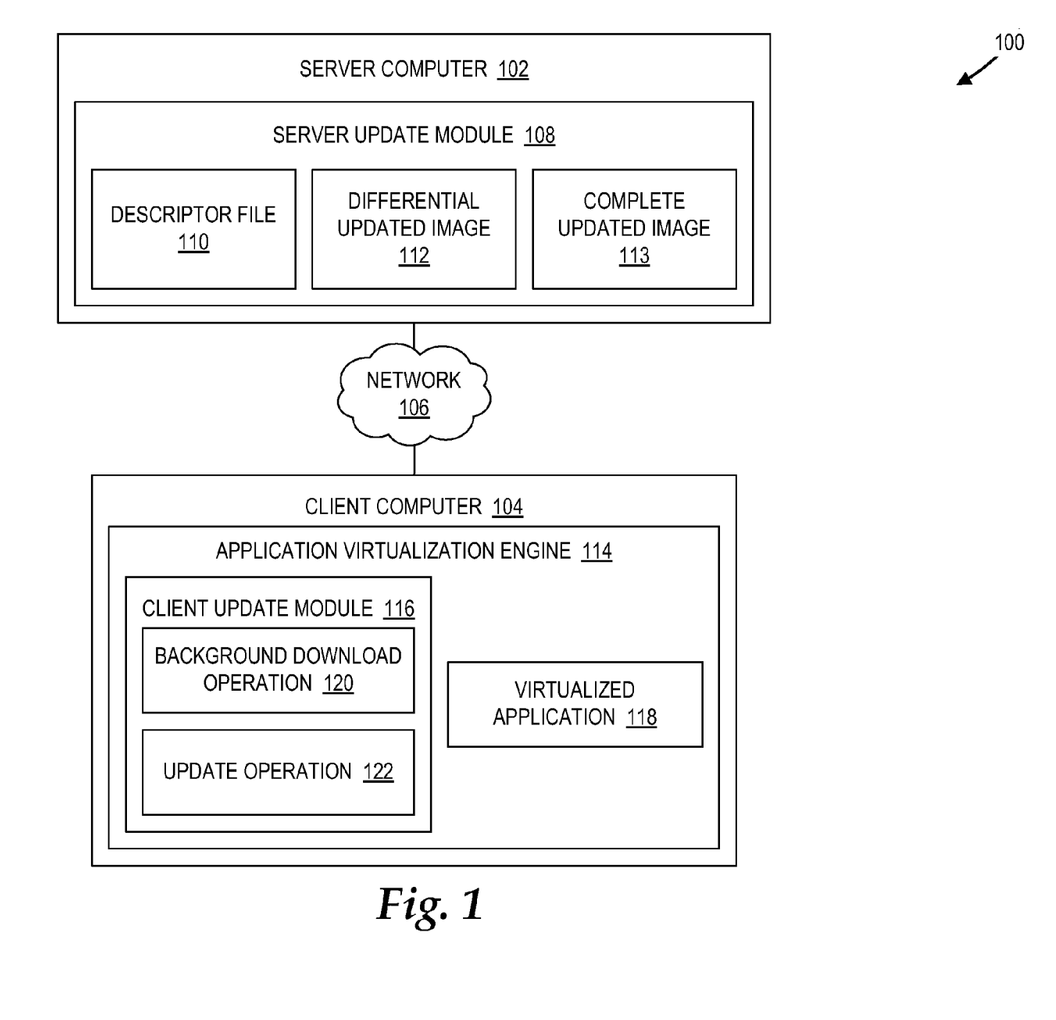
FIG. 1 is a computer architecture diagram showing an illustrative computer architecture configured to update a virtualized application, in accordance with embodiments.

In the following detailed description, references are made to the accompanying drawings that form a part hereof, and which are shown by way of illustration specific embodiments or examples. Referring now to the drawings, in which like numerals represent like elements through the several figures, a computing system and methodology for asynchronously updating a virtualized application will be described. In particular, FIG. 1 illustrates a simplified computer architecture 100 including a server computer 102 and a client computer 104 coupled to a network 106. The server computer 102 may include a server update module 108, which in turn may include a descriptor file 110, a differential updated image 112, and a complete updated image 113. The client computer 104 may include an application virtualization engine 114. The application virtualization engine 114 may include a client update module 116 and a virtualized application 118. The client update module 116 may perform at least a background download operation 120 and an update operation 122.

The application virtualization engine 114 may be configured to execute virtualized applications, such as the virtualized application 118, on the client computer 104. The virtualized applications are not installed on the client computer 104. Rather, the application virtualization engine 114 may be configured to provide a virtual computing environment on which the virtualized applications are executed. The virtualized applications may be locally stored as a self-contained package and executed on the client computer 104 through the application virtualization engine 114. An example of the application virtualization engine 114 is the MICROSOFT APPLICATION VIRTUALIZATION from MICROSOFT CORPORATION. However, implementations of this description may include application virtualization engines 114 available from other vendors as well. The virtualized application 118 may be any suitable application program including, but not limited to, a word processing application, a spreadsheet application, or a presentation application, etc.

During the course of the lifecycle of the virtualized application 118, a software developer may release a variety of updates including, but not limited to, bug fixes, security fixes, new functionality, etc. According to embodiments, the client update module 116 may be configured to update the virtualized application 118 as appropriate. The client update module 116 may periodically contact the server update module 108 to determine whether a new update, such as the differential updated image 112 and/or the complete updated image 113, is available for download. An example of the virtualized application 118 is a SOFTGRID package ("SFT") file; however, other examples are possible as well.

In some embodiments, the client update module 116 may determine whether a new update is available for download as follows. The client update module 116 may periodically download the descriptor file 110. The descriptor file 110 may be retrieved at the same Uniform Resource Locator ("URL") irrespective of when the descriptor file 110 is updated. The descriptor file 110 may be an Extensible Markup Language ("XML") file configured to indicate whether a new update is available. The descriptor file 110 may contain a list of available updates, such as the differential updated image 112 and/or the complete updated image 113, for the virtualized application 118. For example, the descriptor file 110 may include URLs pointing to the differential updated image 112 and/or the complete updated image 113. In this way, the client update module 116 may download the differential updated image 112 and/or the complete updated image 113 through the URL contained in the descriptor file 110.

In some embodiments, the descriptor file 110 may include information about multiple versions of the differential updated image 112 and information about the minimum version appropriate in order to complete the update. Each version of the differential updated image 112 may be associated with a particular update. For example, if the original version of the virtualized application 118 is version A and the current version of the virtualized application 118 is version C, a first differential updated image may update the virtualized application 118 from version A to version B, and a second updated image may update the virtualized application 118 from version B to version C. In this case, the descriptor file 110 may include information regarding the availability of the multiple differential updated images on the server computer 102. For example, if the virtualized application 118 has not been updated for several versions, the server computer 102 may or may not contain all of the differential updated images appropriate to update the virtualized application 118. It should be appreciated that references to retrieving the differential updated image 112 as described herein may be similarly applied for multiple differential updated images.

Upon determining that a new update is available through the descriptor file 110, the client update module 116 may initiate the background download operation 120, which is configured to retrieve the differential updated image 112 from the server computer 102 without affecting the operation of the virtualized application 118. That is, the virtualized application 118 may be fully functional while the background download operation is being performed. The background download operation 120 may be initiated in an automated manner with or without user intervention.

Because the background download operation 120 is performed irrespective of the operation of the virtualized application 118, the background download operation 120 is robust against losses occurring in the connection from the client computer 104 to the network 106. For example, if the client computer 104 loses connection to the network 106 while the background download operation is being performed, the client update module 116 may pause the background download operation 120. When the client computer 104 regains connection to the network 106, the client update module 116 may resume the background download operation 120.

The background download operation 120 may continue until the differential updated image 112 has been completely downloaded. When the differential updated image 112 has been completely downloaded, the client update module 116 may initiate the update operation 122, which is configured to update the virtualized application 118 based on the differential updated image 112. If a user is currently utilizing the virtualized application 118, the client update module 116 may wait until the user has ended her session with the virtualized application 118 to initiate the update operation 122. The client update module 116 may also wait until the next time that the user executes the virtualized application 118 to initiate the update operation 122. The update operation 122 may be initiated in an automated manner with or without user intervention. For example, the update operation 122 may be initiated after a user accepts an end user license agreement ("EULA") or other conditions.

As described in greater detail below with respect to FIG. 2, the update operation 122 may replace at least a portion of the virtualized application 118 with the differential updated image 112. Thus, the differential updated image 112 may contain a portion or subset of the virtualized application 118 to be replaced or added. This portion or subset update may reduce the size of the differential updated image 112 and may allow for a faster download. When the virtualized application 118 has been updated with the differential updated image 112, the virtualized application 118 is available for execution through the application virtualization engine 114.

Conventional updates to a virtualized application are typically made through an online update process. The online update process may rely on an active and continuous connection for downloading any update files. During the online update process, the virtualized application may become unusable or sluggish. Even a temporary loss of connection during the online update process may cause the virtualized application to remain in an unusable state, at least until the connection is restored. This loss of functionality during the online update process can cause significant frustration to users and reduced productivity. Unlike the conventional online update process, the combination of the background download operation 120 and the update operation 122, as described in embodiments herein, are robust against any loss of connection to a network.

If an error occurs while attempting to retrieve the differential updated image 112, the client update module 116 may terminate any active sessions of the virtualized application 118 and retrieve the complete updated image 113. An error may occur if the differential updated image 112 is corrupt. An error may also occur if the appropriate differential updated image 112 is unavailable on the server computer 102. For example, an error may occur if the current version of the virtualized application 118 is version A and the differential updated image 112 is configured to only update the virtualized application 118 from version B to version C. In this case, in order to update the virtualized application 118 from version A to version C, another differential updated image may be appropriate to update the virtualized application 118 from version A to version B prior to applying the differential updated image 112 to update the virtualized application 118 from version B to version C.

According to embodiments, in the default update process, the client update module 116 may terminate any active sessions of the virtualized application 118. The client update module 116 may then invalidate some or all of the outdated blocks of the virtualized application 118 and retrieve the complete updated image 113. Unlike the differential updated image 112 which may be configured to update the virtualized application 118 from one version to another version, the complete updated image 113 may contain a complete set of blocks in the virtualized application 118. Upon retrieving the complete updated image 113, the client update module 116 may update the virtualized application 118 by replacing the outdated blocks in the virtualized application 118 with current blocks from the complete updated image 113.

Figure 2:
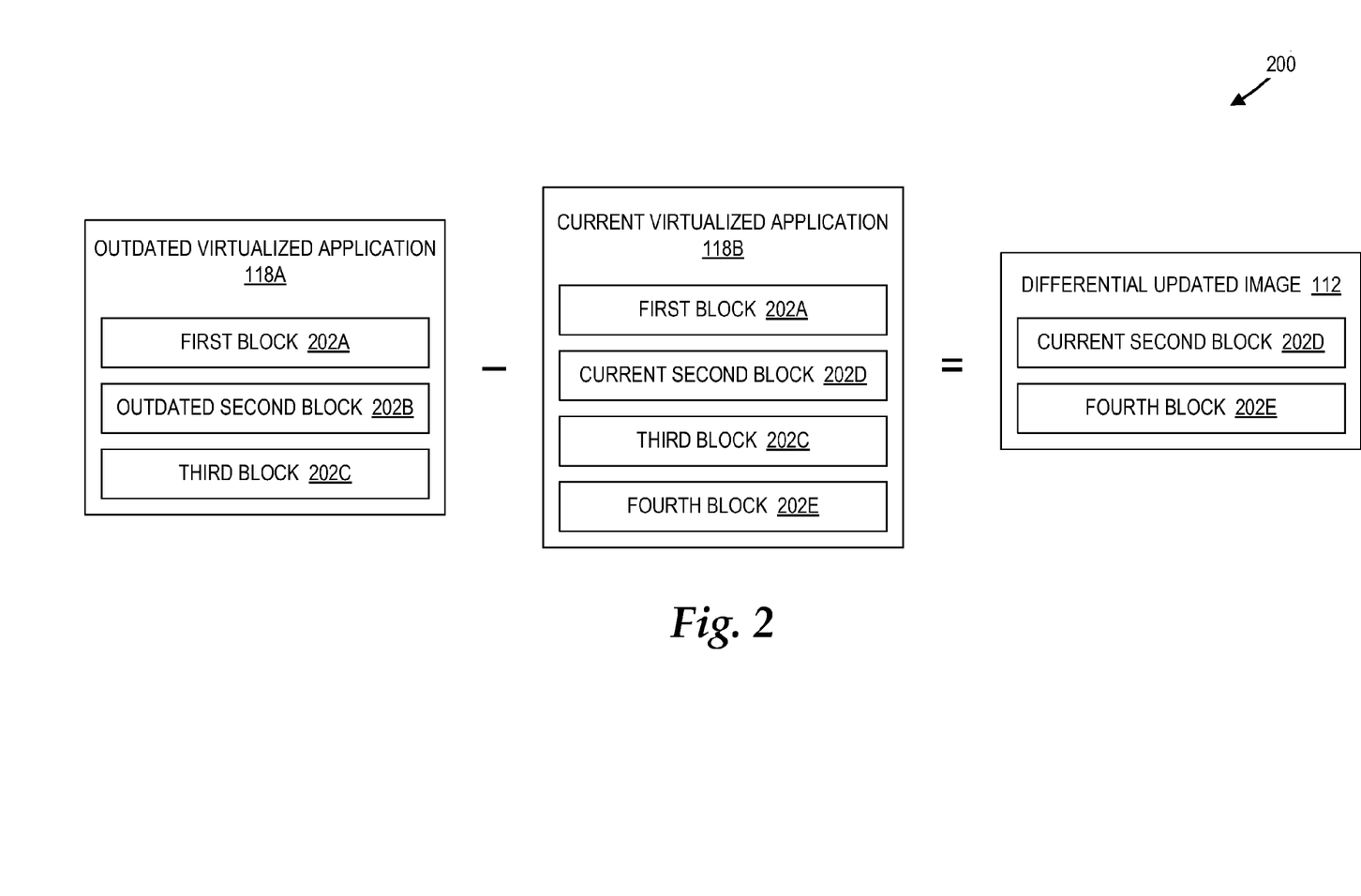
FIG. 2 is a block diagram showing an illustrative implementation of an updated image, in accordance with embodiments.
Figure 3:
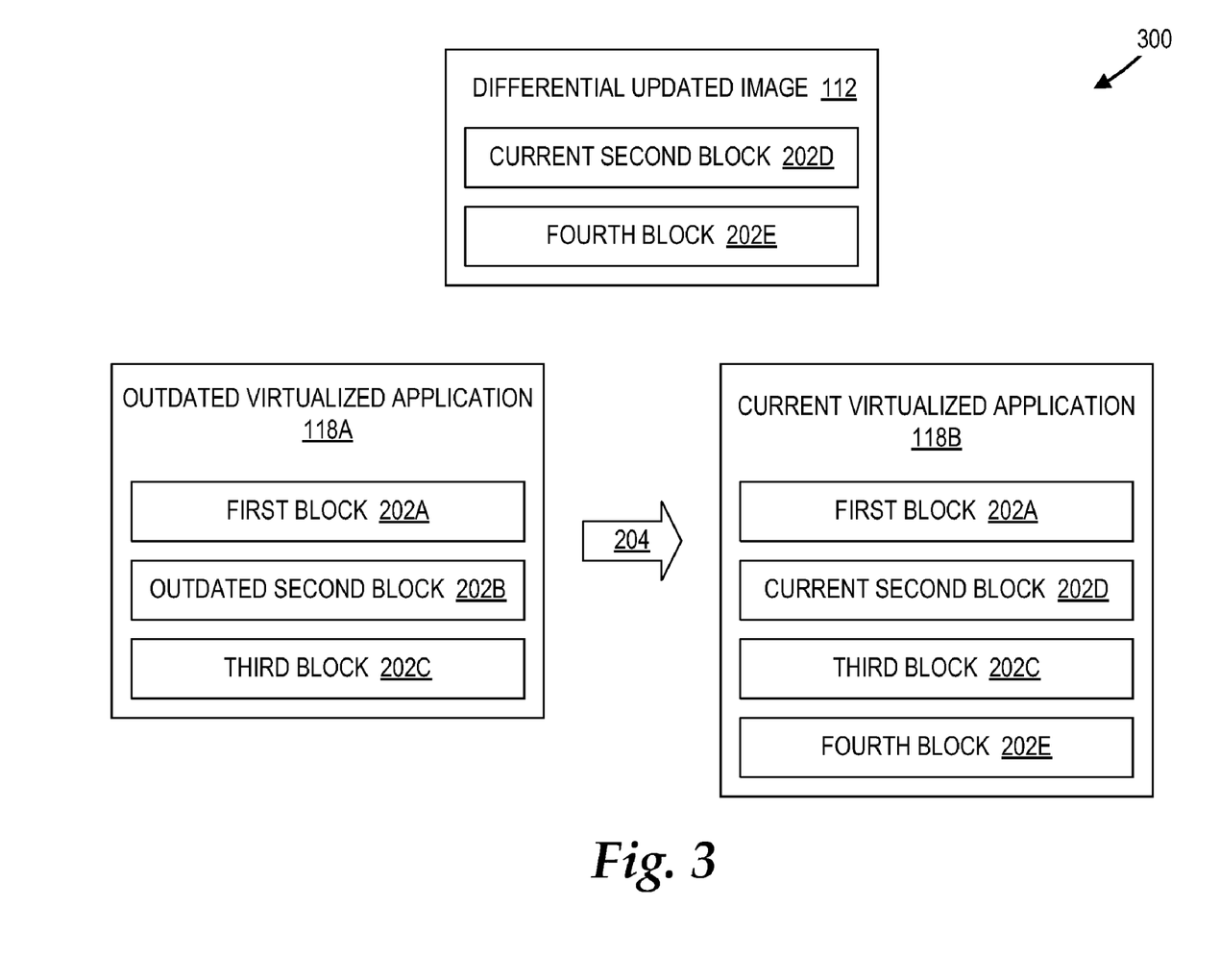
FIG. 3 is a block diagram showing an illustrative transformation from an outdated virtualized application to a current virtualized application, in accordance with embodiments.

Referring now to FIGS. 2 and 3, additional details regarding update operation 122 and the differential updated image 112 will be described. In particular, FIG. 2 is a block diagram 200 showing illustrative implementations of the differential updated image 112, according to embodiments. FIG. 3 is a block diagram 300 showing illustrative transformations from an outdated virtualized application 118A to a current virtualized application 118B based on the differential updated image 112, according to embodiments.

In FIG. 2, the block diagram illustrates implementations of the differential updated image 112 as a differential image. To facilitate this description, the term "differential image" refers to the difference between an updated virtualized application 118A and a current virtualized application 118B. The outdated virtualized application 118A may represent the version of the virtualized application 118 prior to completing the update operation 122. The current virtualized application 118B may represent the version of the virtualized application 118 after completing the update operation 122. It should be appreciated that the complete updated image 113 and the current virtualized application 118B may contain the same blocks.

In the example illustrated in FIG. 2, the outdated virtualized application 118A includes a first block 202A, an outdated second block 202B, and a third block 202C. Although FIG. 2 illustrates only three blocks 202A-202C, it should be appreciated that a virtualized application may include any number of blocks. Further, although FIG. 2 illustrates that the virtualized application is divided by blocks, it should be appreciated that a virtualized application may be divided according to other suitable ways (e.g., files). Also in the example illustrated in FIG. 2, the current virtualized application 118B includes the first block 202A, a current second block 202D, the third block 202C, and a fourth block 202E.

In the examples shown in FIG. 2, the outdated virtualized application 118A and the current virtualized application 118B include the first block 202A and the third block 202C. Thus, the difference between the outdated virtualized application 118A and the current virtualized application 118B is the current second block 202D and the fourth block 202E. Thus, the differential updated image 112, when implemented as a differential image, may be configured to include the current second block 202D and the fourth block 202E. In order to reduce the size of the differential updated image 112, the differential updated image 112 may include the subset of blocks that are replaced in the outdated virtualized application 118A.

In FIG. 3, the block diagram 300 illustrates transformations from the outdated virtualized application 118A to the current virtualized application 118B, as indicated by an arrow 204. According to the example illustrated in FIG. 3, the differential updated image 112 includes the current second block 202D, which is configured to replace the outdated second block 202B in the outdated virtualized application 118A, and a fourth block 202E. During the update operation 122, the client update module 116 may transform the outdated virtualized application 118A to the current virtualized application 118B by replacing the outdated second block 202B with the current second block 202D and adding the fourth block 202E from the differential updated image 112.

Figure 4:
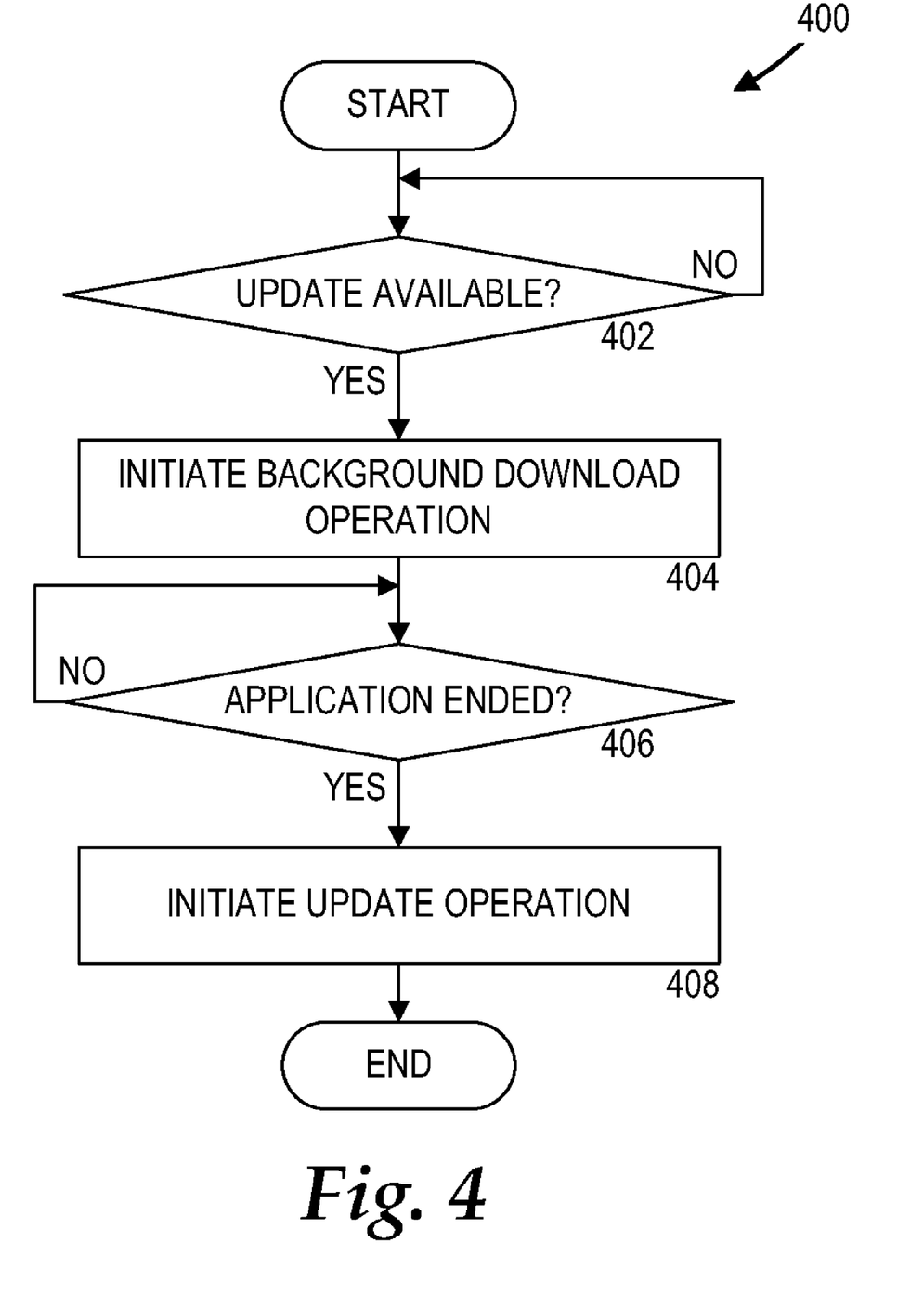
FIG. 4 is a flow diagram illustrating a method for updating a virtualized application, in accordance with embodiments.
Figure 5:
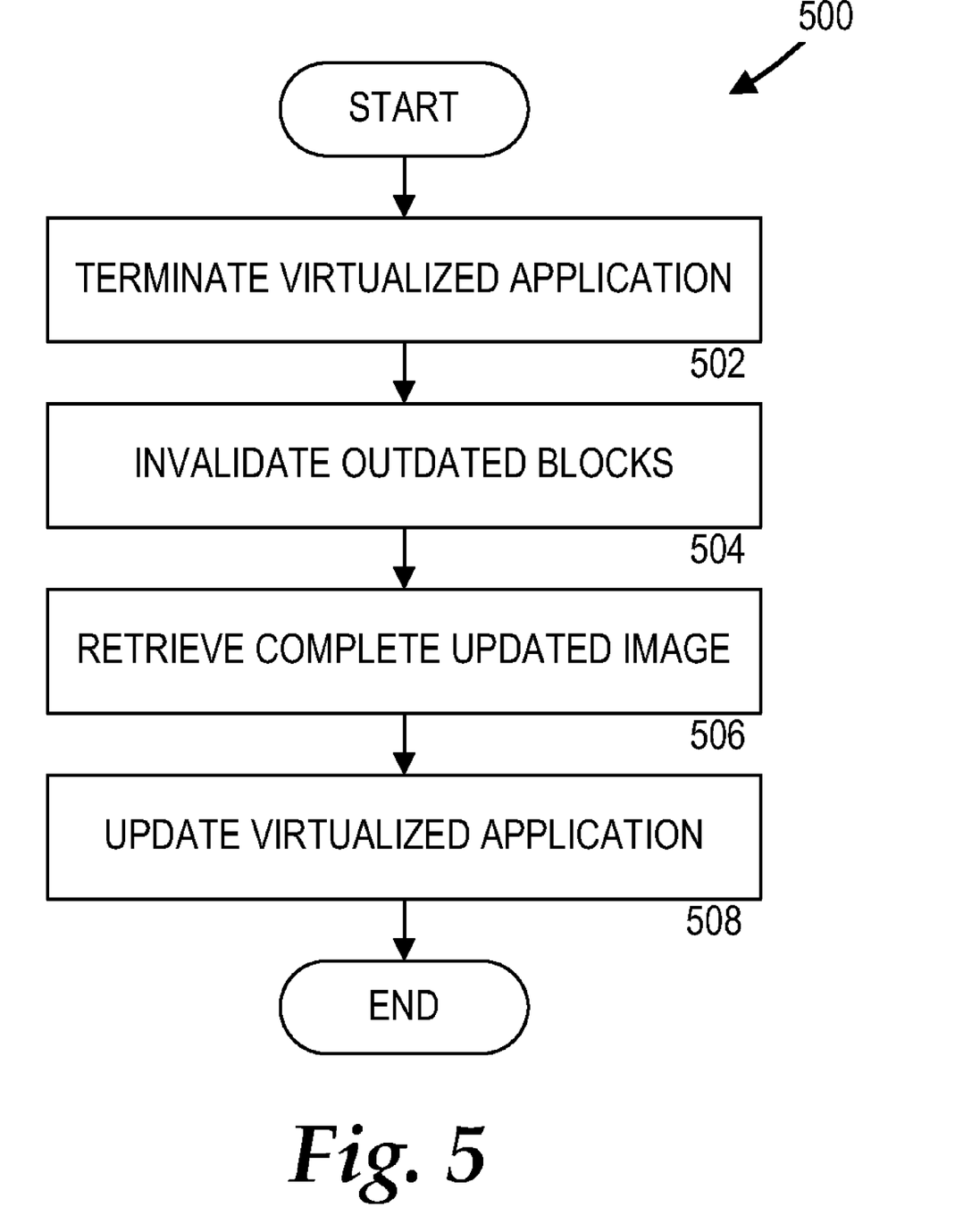
FIG. 5 is a flow diagram illustrating a method for updating a virtualized application after encountering an error, in accordance with embodiments.

Referring now to FIG. 4, additional details regarding the update operation 122 will be described. In particular, FIG. 4 shows a flow diagram illustrating methods for updating a virtualized application, such as the virtualized application 118, according to embodiments. FIG. 5 shows a flow diagram illustrating methods for updating a virtualized application after encountering an error during the update operation 122. For example, the method illustrated in FIG. 5 may be performed if the differential updated image 112 is corrupt, if the differential updated image 112 is unavailable, or if the update operation 122 otherwise fails.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a routine 400 begins at operation 402, where the client update module 116 determines whether an update, such as the differential updated image 112, is available for updating the virtualized application 118. In some embodiments the client update module 116 may retrieve the descriptor file 110 from the server update module 108. The descriptor file 110 may indicate whether an update is available. The descriptor file 110 may also provide URLs to the differential updated image 112 and other updates.

The client update module 116 may periodically check whether an update is available. If the client update module 116 determines that an update is available, then the routine 400 proceeds to operation 404. At operation 404, the client update module 116 initiates the background download operation 120. As previously described, the background download operation 120 may retrieve the differential updated image 112 without affecting the operation of the virtualized application 118. That is, a user may continue utilizing the virtualized application 118 and may not even be aware that the background download operation 120 has been initiated. The background download operation 120 may retrieve the differential updated image 112 via the URL provided by the descriptor file 110. When the background download operation 120 has been initiated, the routine 400 proceeds to operation 406.

At operation 406, the client update module 116 determines whether the virtualized application 118 is currently executing. In particular, if the user is currently utilizing the virtualized application 118, then the client update module 116 may wait until the user has ended her session with the virtualized application 118 to perform the update operation 122. When the client update module 116 determines that the virtualized application 118 is no longer executing (i.e., the current session of the virtualized application 118 has ended), the routine 400 may proceed to operation 408.

At operation 408, the client update module 116 may initiate the update operation 122. As previously discussed, the update operation 122 may transform the outdated virtualized application 118A to the current virtualized application 118B by replacing at least a portion of the outdated virtualized application 118 with the differential updated image 112. When the outdated virtualized application 118A is transformed to the current virtualized application 118B, the current virtualized application 118B becomes available for execution through the application virtualization engine 114.

In FIG. 5, the routine 500 begins at operation 502, where the client update module 116 may actively terminate or pause the operation of the virtualized application 118. The routine 500 may then proceed to operations 504 and 506, where the client update module 116 invalidates any outdated blocks in the virtualized application 118 and retrieves the complete updated image 113 from the server update module 108. When the client update module 116 is retrieves the complete updated image 113 from the server update module 108, the routine 500 may proceed to operation 508, where the client update module 116 transforms the outdated virtualized application 118A to the current virtualized application 118B by replacing the outdated blocks in the outdated virtualized application with current blocks from the complete updated image 113.

Figure 6:
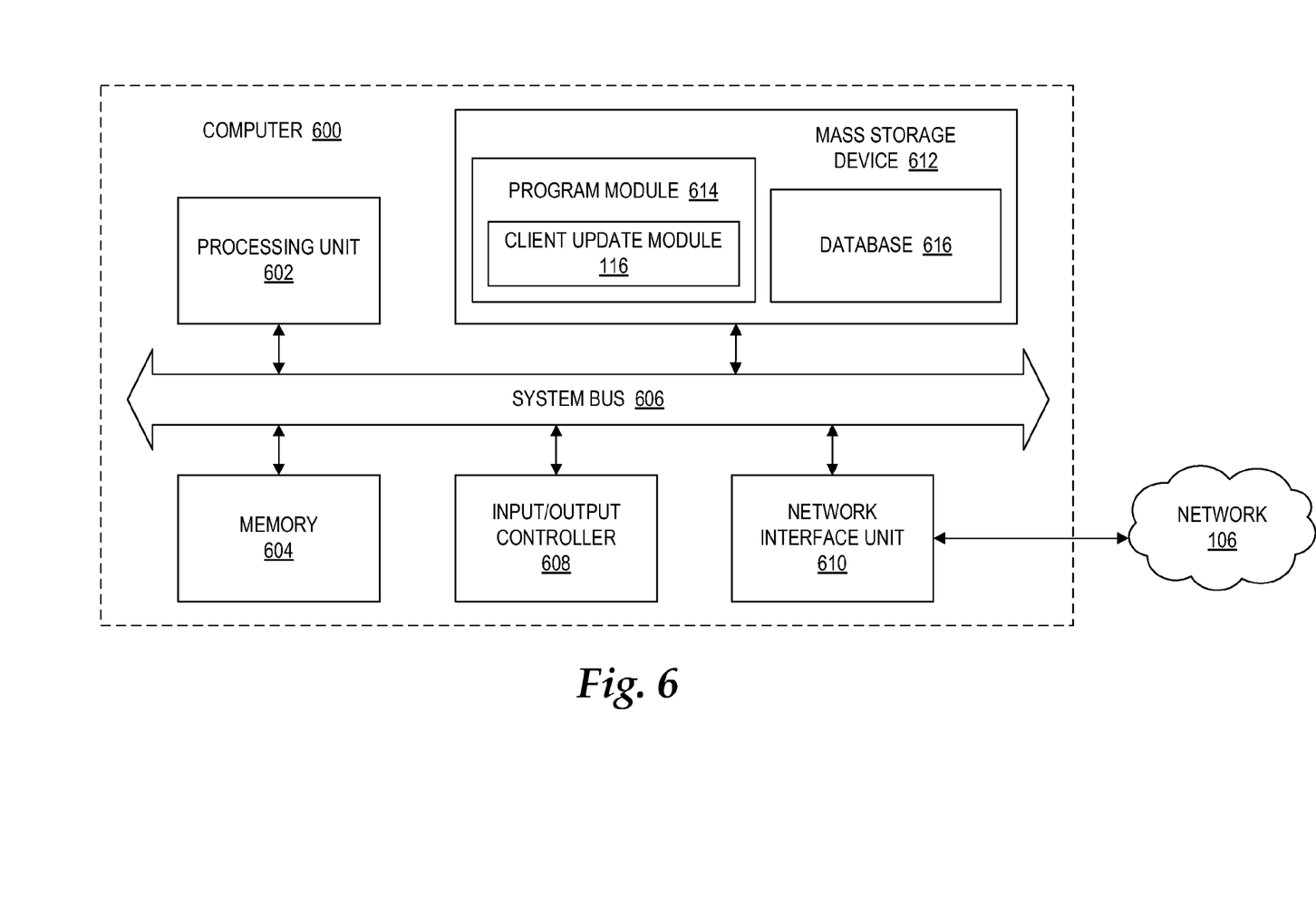
FIG. 6 is a computer architecture diagram showing an illustrative computer hardware architecture for a computing system capable of implementing the embodiments presented herein.

Referring now to FIG. 6, an example computer architecture diagram showing a computer 600 is illustrated. An example of the computer 600 may include the computer 102 of FIG. 1. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 include the client update module 116. The databases 616 may be configured to store the descriptor file 110, the updated image 112, and the complete updated image 113. The mass storage device 612 is connected to the CPU 602 through a mass storage controller (not shown) connected to the bus 606. The mass storage device 612 and its associated computer-storage media provide non-volatile storage for the computer 600. Although the description of computer-storage media contained herein refers to a mass storage device, such as a hard disk or CD-ROM drive, it should be appreciated by those skilled in the art that computer-storage media can be any available computer storage media that can be accessed by the computer 600.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 106. The computer 600 may connect to the network 106 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

The bus 606 may enable the processing unit 602 to read code and/or data to/from the mass storage device 612 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 614 may include software instructions that, when loaded into the processing unit 602 and executed, cause the computer 600 to update a virtualized application. The program modules 614 may also provide various tools or techniques by which the computer 600 may participate within the overall systems or operating environments using the components, flows, and data structures discussed throughout this description. For example, the program modules 614 may implement interfaces for updating a virtualized application.

In general, the program modules 614 may, when loaded into the processing unit 602 and executed, transform the processing unit 602 and the overall computer 600 from a general-purpose computing system into a special-purpose computing system customized to update a virtualized application. The processing unit 602 may be constructed from any number of transistors or other discrete circuit elements, which may individually or collectively assume any number of states. More specifically, the processing unit 602 may operate as a finite-state machine, in response to executable instructions contained within the program modules 614. These computer-executable instructions may transform the processing unit 602 by specifying how the processing unit 602 transitions between states, thereby transforming the transistors or other discrete hardware elements constituting the processing unit 602.

Encoding the program modules 614 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 614 may transform the physical state of the semiconductor memory, when the software is encoded therein. For example, the program modules 614 may transform the state of transistors, capacitors, or other discrete circuit elements constituting the semiconductor memory.

As another example, the computer-storage media may be implemented using magnetic or optical technology. In such implementations, the program modules 614 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for updating a virtualized application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for updating a virtualized application on a computer coupled to a server on a network, the computer-implemented method comprising computer-implemented operations for:
 retrieving a descriptor file from a server, the descriptor file comprising an Extensible Markup Language (XML) file;
 determining whether the descriptor file contains an indication that a differential image is available on the server, the differential image comprising a difference between an outdated virtualized application and a current virtualized application;
 upon determining that the descriptor file contains the indication that the differential image is available, initiating a background download operation configured to retrieve the differential image from the server, the background download operation configured to preserve full functionality of the outdated virtualized application until the outdated virtualized application is transformed;
 determining whether the outdated application is being utilized;
 upon completing the background download operation and determining that the outdated application is not being utilized, transforming the outdated application to the current virtualized application by replacing at least a portion of the outdated application with the differential image, the outdated virtualized application and the current virtualized application configured to be executed on the computer without installation on the computer, the outdated virtualized application, the current virtualized application, and the differential image each comprising a SOFTGRID package (SFT) file;
 upon completing the background download operation, determine whether the differential image is corrupt;
 upon determining that the differential image is corrupt, terminate the outdated virtualized application, invalidate outdated blocks in the outdated virtualized application, retrieve a complete image from the server, and transform the outdated virtualized application to the current virtualized application by replacing the outdated blocks in the outdated virtualized application with current blocks from the complete image;
 upon completing the background download operation, determine whether the differential image is unavailable; and
 upon determining that the updated image is unavailable, terminate the outdated virtualized application, invalidate outdated blocks in the outdated virtualized application, retrieving the complete image from the server, and transform the outdated virtualized application to the current virtualized application by replacing the outdated blocks in the outdated virtualized application with current blocks from the complete image.

2. The computer-implemented method of claim 1, wherein the descriptor file contains a uniform resource locator (URL) specifying a location on the server from which to retrieve the differential image.

3. The computer-implemented method of claim 1, wherein initiating the background download operation configured to download the differential image from the server comprises initiating the background download operation configured to download two or more differential images, the two or more updated images comprising a first differential image and a second differential image; and
wherein transforming the outdated virtualized application to the current virtualized application by replacing at least a portion of the outdated virtualized application with the differential image comprises (a) transforming the outdated virtualized application to an intermediate virtualized application by replacing at least a portion of the outdated virtualized application with the first differential image and (b) transforming the intermediate virtualized application to the current virtualized application by replacing at least a portion of the intermediate virtualized application with the second differential image.

4. The computer-implemented method of claim 1, wherein the virtualized application comprises one or more of a word processing application, a spreadsheet application, or a presentation application.

5. A computer system, comprising: a processor;
a memory operatively coupled to the processor; and
a program module (i) which executes in the processor from the memory and (ii) which, when executed by the processor, causes the computer system to update a virtualized application on the computer system coupled to a server on a network by
retrieving a descriptor file from a server, the descriptor file comprising an Extensible Markup Language (XML) file;
determining whether the descriptor file contains an indication that a differential image is available on the server, the differential image comprising a difference between an outdated virtualized application and a current virtualized application;
upon determining that the descriptor file contains the indication that the differential image is available, initiating a background download operation configured to retrieve the differential image from the server, the background download operation configured to preserve full functionality of the outdated virtualized application until the outdated virtualized application is transformed,
determining whether the outdated application is being utilized,
upon completing the background download operation and determining that the outdated application is not being utilized, transforming the outdated application to the current virtualized application by replacing at least a portion of the outdated application with the differential image, the outdated virtualized application and the current virtualized application configured to be executed on the computer without installation on the computer system], the outdated virtualized application, the current virtualized application, and the differential image each comprising a SOFTGRID package (SFT) file;
upon completing the background download operation, determining whether the differential image is corrupt;
upon determining that the differential image is corrupt, terminating the outdated virtualized application, invalidating outdated blocks in the outdated virtualized application, retrieving a complete image from the server, and transforming the outdated virtualized application to the current virtualized application by replacing the outdated blocks in the outdated virtualized application with current blocks from the complete image;
upon completing the background download operation, determining whether the differential image is unavailable; and
upon determining that the updated image is unavailable, terminating the outdated virtualized application, invalidating outdated blocks in the outdated virtualized application, retrieving the complete image from the server, and transforming the outdated virtualized application to the current virtualized application by replacing the outdated blocks in the outdated virtualized application with current blocks from the complete image.

6. The computer system of claim 5, wherein the descriptor file contains a uniform resource locator (URL) specifying a location on the server from which to retrieve the differential image.

7. The computer system of claim 5, wherein the virtualized application comprises one or more of a word processing application, a spreadsheet application, or a presentation application.

8. A computer-storage medium having computer-executable instructions stored thereon which, when executed by a computer, cause the computer to:
retrieve a descriptor file from a server, the descriptor file comprising an Extensible Markup Language (XML) file;
determine whether the descriptor file contains an indication that a differential image is available on the server, the differential image comprising a difference between an outdated virtualized application and a current virtualized application;
upon determining that the descriptor file contains the indication that the differential image is available, initiate a background download operation configured to retrieve the differential image from the server, the background download operation configured to preserve full functionality of the outdated virtualized application until the outdated virtualized application is transformed;
determine whether the outdated virtualized application is being utilized;
upon completing the background download operation and determining that the outdated virtualized application is not being utilized, transform the outdated virtualized application to the current virtualized application by replacing at least a portion of the outdated virtualized application with the differential image, the outdated virtualized application and the current virtualized application configured to be executed on the computer without installation on the computer, the outdated virtualized application, the current virtualized application, and the differential image each comprising a SOFTGRID package (SFT) file;
upon completing the background download operation, determine whether the differential image is corrupt;
upon determining that the differential image is corrupt, terminate the outdated virtualized application, invalidate outdated blocks in the outdated virtualized application, retrieve a complete image from the server, and transform the outdated virtualized application to the current virtualized application by replacing the outdated blocks in the outdated virtualized application with current blocks from the complete image;

upon completing the background download operation, determine whether the differential image is unavailable; and upon determining that the updated image is unavailable, terminate the outdated virtualized application, invalidate outdated blocks in the outdated virtualized application, retrieve the complete image from the server, and transform the outdated virtualized application to the current virtualized application by replacing the outdated blocks in the outdated virtualized application with current blocks from the complete image.

* * * * *